(12) United States Patent
Goh et al.

(10) Patent No.: US 8,559,461 B2
(45) Date of Patent: *Oct. 15, 2013

(54) PACKET DATA TRANSMISSION WITH OPTIMUM PREAMBLE LENGTH

(75) Inventors: Wee Pen Goh, Temecula, CA (US); Anton Monk, San Diego, CA (US); Ron Porat, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 435 days.

This patent is subject to a terminal disclaimer.

(21) Appl. No.: 12/789,208

(22) Filed: May 27, 2010

(65) Prior Publication Data

US 2010/0296522 A1 Nov. 25, 2010

Related U.S. Application Data

(63) Continuation of application No. 11/229,196, filed on Sep. 16, 2005, now Pat. No. 7,738,355.

(60) Provisional application No. 60/633,247, filed on Dec. 3, 2004.

(51) Int. Cl.
*H04J 3/24* (2006.01)

(52) U.S. Cl.
USPC .......................................... 370/474

(58) Field of Classification Search
USPC ......... 370/203, 204–215, 229–240, 310–337, 370/338–350, 395.1, 395.3, 395.4, 395.41, 370/395.42, 395.5, 395.52, 395.53, 370/412–421, 431–457, 458–463, 464–497, 370/498–522, 523–520, 521–529, 1

See application file for complete search history.

(56) References Cited

U.S. PATENT DOCUMENTS

| | | | | |
|---|---|---|---|---|
| 6,614,864 B1* | 9/2003 | Raphaeli et al. | | 375/371 |
| 7,251,282 B2* | 7/2007 | Maltsev et al. | | 375/260 |
| 7,738,355 B1* | 6/2010 | Goh et al. | | 370/204 |
| 7,787,357 B2* | 8/2010 | Kelley et al. | | 370/208 |
| 7,809,020 B2* | 10/2010 | Douglas et al. | | 370/474 |
| 2002/0159540 A1* | 10/2002 | Chiodini | | 375/316 |
| 2003/0137966 A1* | 7/2003 | Odman et al. | | 370/347 |
| 2004/0170237 A1* | 9/2004 | Chadha et al. | | 375/343 |
| 2004/0223554 A1* | 11/2004 | Cha | | 375/260 |
| 2007/0291632 A1* | 12/2007 | Li et al. | | 370/203 |

* cited by examiner

*Primary Examiner* — Jung-Jen Liu
(74) *Attorney, Agent, or Firm* — Bruce W. Greenhaus; Richard A. Bachand; Sheppard Mullin Richter & Hampton LLP

(57) ABSTRACT

In a communication network, a sending node transmits a message with a multi-segment preamble and data to a receiving node. The receiving node calculates characteristics of the sending unit, channel, or transmitted signal by processing preamble segments. Once an unknown characteristic is determined, a segment of the preamble can be eliminated or reduced in length for subsequent messages, which increases efficiency of the message transmissions.

5 Claims, 3 Drawing Sheets

PACKET DATA TRANSMISSION WITH OPTIMUM PREAMBLE LENGTH

RELATED APPLICATIONS

This application is a continuation of U.S. patent application Ser. No. 11/229,196, filed Sep. 16, 2005, entitled "Packet Data Transmission with Optimum Preamble Length", which claims the benefit of priority of the following application: U.S. provisional patent application Ser. No. 60/633,247 filed Dec. 3, 2004 entitled "Packet Data Transmission with Optimum Preamble Length", incorporated herein by reference.

BACKGROUND

1. Field of Invention

The invention relates to broadband communication networks.

2. Prior Art

Data packet transmission uses a known preamble field at the beginning of each packet to allow a receiver to determine certain characteristics of the signal or channel. The preamble does not communicate any user information and is overhead that reduces the bandwidth efficiency of the system. Among the characteristics determined through processing of the preamble are: start of packet time, carrier frequency offset, bit timing, channel response, and signal amplitude. A longer preamble enables the determination of unknown parameters with greater precision, but at the expense of reducing user data capacity.

It is desirable to minimize the length of the preamble to increase the utilization efficiency of the communication channel.

SUMMARY OF THE INVENTION

A packet preamble has discrete segments that are each used to resolve some uncertainty in a characteristic of the received signal and communication channel. Segments of the transmitted preamble are eliminated as the corresponding characteristics of the signal and channel are determined. A specific segment of the preamble is used for each characteristic, and therefore that respective segment of preamble can be eliminated when the characteristic becomes known. After a segment of the preamble is eliminated, the time interval occupied by that preamble segment can be re-allocated and used for transmitting user data. Messages can be packed closer together to utilize the time interval saved by optimizing the preamble length.

In one embodiment, segments of the preamble are initially transmitted at one predetermined length, and then reduced to a shorter predetermined length. A receiving node communicates to the transmitting node to indicate that a message has been processed and an unknown characteristic has been resolved. An acknowledgement from a receiving node can be an express message or can be implicit in a response transmitted by the receiving node.

In one embodiment, different preamble lengths are transmitted and processed differently in the receiver using either autocorrelation detection or cross correlation detection. An initial message is sent with a long preamble that is processed in the receiver using an auto-correlation function. Autocorrelation processing is more robust to multipath effects and frequency offset. After determining frequency offset, a shorter preamble is transmitted that is processed using a cross-correlation function.

A segment of the preamble is used for automatic gain control (AGC) adjustment. Signal level is estimated by evaluating the first N1 bits of the preamble. After an estimate of signal level is made, the front-end gain is adjusted to fit the signal into the processing amplitude range. An additional N2 bits of the preamble are evaluated for a more precise estimate. Several level estimates and correction cycles are possible during the AGC preamble time. After AGC converges, no AGC preamble is required. AGC tracking can be performed on other parts of the preamble or on the data field for fine adjustment due to environmental variation such as temperature.

Initial channel estimation is performed by a specific segment of the preamble, for example using 4 orthogonal frequency division multiplex (OFDM) symbols.

DETAILED DESCRIPTION OF THE INVENTION

Figure 1:
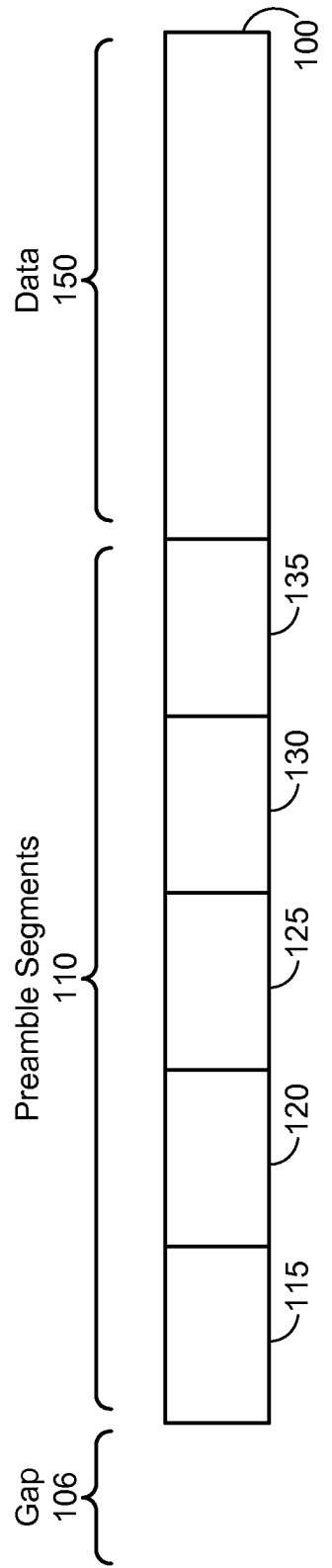
FIG. 1 shows a segmented preamble according to the present invention.

FIG. 1 shows a representation of message packet 100 for use with the present invention. Gap 105 is a time interval where no transmission activity occurs. A message packet comprises preamble section 110 and data section 150.

Preamble 110 is comprised of several segments, each of which is used by the receiver to determine a characteristic of the signal or channel. Message preamble 110 comprises a time domain preamble and a frequency domain preamble. Each segment of the preamble is variable in length or is removed as the receiving node determines characteristics of the channel and the transmitted signal. When the preamble is shortened, the efficiency of the communication channel is increased. By employing this technique, the preamble can be shortened from 6 symbols to 3 symbols. For a typical data message length of 10 symbols and a total packet length of 16 symbols, a reduction of 3 symbols is significant.

The time domain preamble comprises short training sequence 115, long training sequence 120, correlator sequence 125 and is transmitted as a series of QPSK symbols at the sample clock rate of 50 million symbols per second (Msps), or a duration of 20 nanoseconds (nS) each.

Short training sequence 115 is used for coarse AGC setting. The signal amplitude is measured several times during this sequence and the AGC setting is adjusted after each measurement to achieve a reasonable degree of accuracy in the final AGC setting. The AGC setting is used for the remaining duration of the packet. The short training sequence, when present, is formed by repeating A times a predetermined short training pattern of 30 QPSK symbols, where A is, for example, equal to 8. The actual value of A is determined by performance characteristics of the integrated circuit devices used to implement the circuitry. Each 30-symbol pattern is transmitted at the sample clock rate and has a duration of 0.6 microseconds (uS).

AGC is performed in the receiver by passing the received signal through a variable gain amplifier, the gain of which is controlled by a voltage or digital value.

Long training sequence 120 is used for signal detection, fine frequency offset estimation, and timing synchronization.

A long training sequence, when present, is formed by repeating B times a predetermined long training pattern of 64 QPSK symbols, where B is, for example, equal to 4 or 8. Each 64-symbol pattern is transmitted at the sample clock rate and has a duration of 1.28 uS.

Correlator sequence 125 is used for fine timing determination. The correlator sequence, when present, is 64 or 128 symbols.

Frequency domain preamble 130 is used for channel estimation and gives the receiver the ability to measure the multipath condition. This information can be used by the receiving node to determine optimum bit loading for the channel or bitloading can be determined by the data portion of separate error vector magnitude (EVM) probe messages. The bit loading information is transmitted to the sending node to be used in subsequent packet transmissions. The frequency domain preamble comprises one or more OFDM symbols transmitted with a duration of 5.12 uS each. Additional frequency domain preamble segment 135 can be used for an improved channel estimate.

Each OFDM symbol is transmitted with a cyclic prefix, also known as a guard interval, of 0 to 64 samples followed by 256 samples of data.

Data section 150 of the message packet is comprised of one or more OFDM symbols.

Message packets are transmitted from a sending node to a receiving node by forming an initial message packet comprising the concatenation of a message packet preamble comprising a plurality of segments; a data field comprising a plurality of data symbols; transmitting the initial message packet; in a receiving node, detecting the initial message packet and determining at least one unknown signal characteristic of the initial message packet; transmitting to the sending node an indication that an unknown characteristic has been determined; in the sending node, forming an optimized message packet by removing at least one segment from the preamble of the initial message packet; and transmitting the optimized message packet.

In one embodiment, a Network Coordinator node schedules time slots in response to reservation requests from each sending node. When a sending node receives a message from the receiving node that the message preamble can be reduced, the sending node reserves a shorter time slot for transmitting the message packet. The Network Coordinator node can change the schedule of time slots, thereby reducing gap times to make available a contiguous interval for use by additional messages.

A typical process would begin with the client node receiving a long preamble packet with preamble segment 115, 120 and 125, preamble 130 and some data symbols. The segment 115 would trigger the AGC to calculate the amplifier gain require to bring the signal to a target reference level. Assuming the channel is quasi-static, this value is stored for use by future packets. Segment 120 is used to calculate the frequency offset which would also be stored for use by future packets. Segment 125 is then used to determine the precise start time for data symbol recovery. Optional segment 135 can be used for improved channel estimate.

With the frequency estimate and the AGC gain value estimate, subsequent packet would only need preamble segment 125 for detection and determination of the precise start time of the data symbol. As frequency estimate is expected to drift over time, adjustment can be made using a frequency-tracking loop. Likewise, energy measurement of preamble segment 125 would be used to make small adjustment to the AGC gain value.

Segment 120 is designed for detection using an autocorrelation method. This method is insensitive to frequency offset and multipath. Segment 125 is designed for cross-correlation detection that provides a more precise estimation of the packet start time. However, this method is highly sensitive to frequency offset and requires precise knowledge of the multipath. Hence, it is required that frequency offset has to be pre-determined prior to using segment 125. Segment 125 further provides protection against false detection from external sources of interference. It serves as a final check for false alarm. By detecting the false alarm prior to data demodulation helps to reduce the system overhead as the receiver can be reinitialized and be ready to receive the next packet without spending time analyzing the received data.

After the receiver determines the correct AGC level, or other parameters of the received message, a response message is sent to the sending unit that indicates the AGC or other portion of the preamble can be eliminated or reduced in length. The response message can be a specific message or a portion of another message that carries the preamble modification indication.

Figure 2:
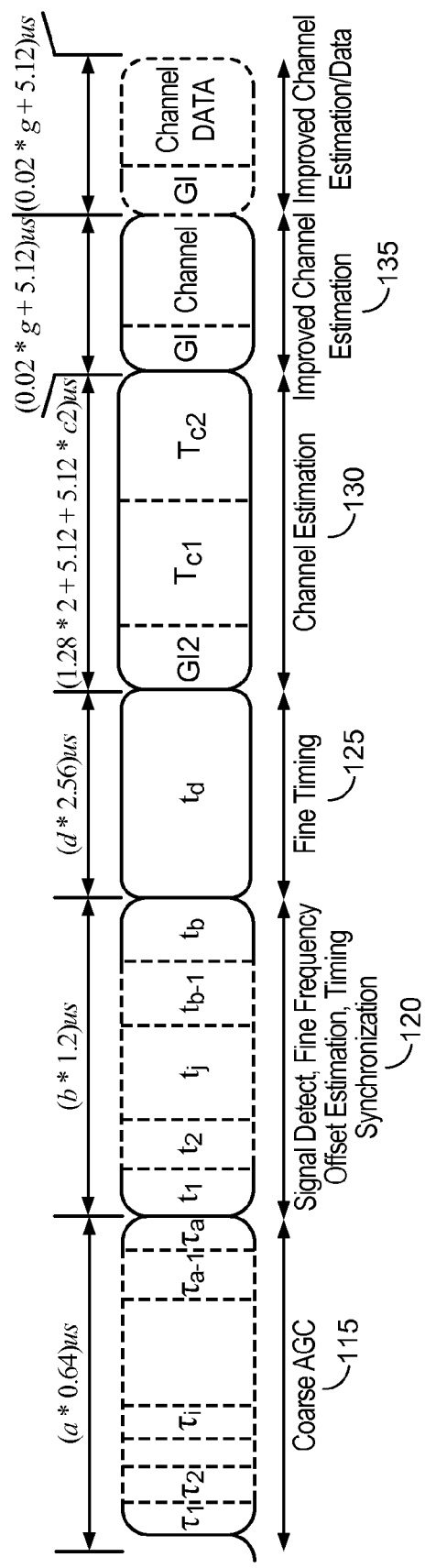
FIG. 2 shows details of segments of a preamble according to the present invention.

FIG. 2 shows an example of detailed parameter values for each preamble segment. The numeric values of various parameters are dependent on design implementation factors, such as data rate.

Figure 3:
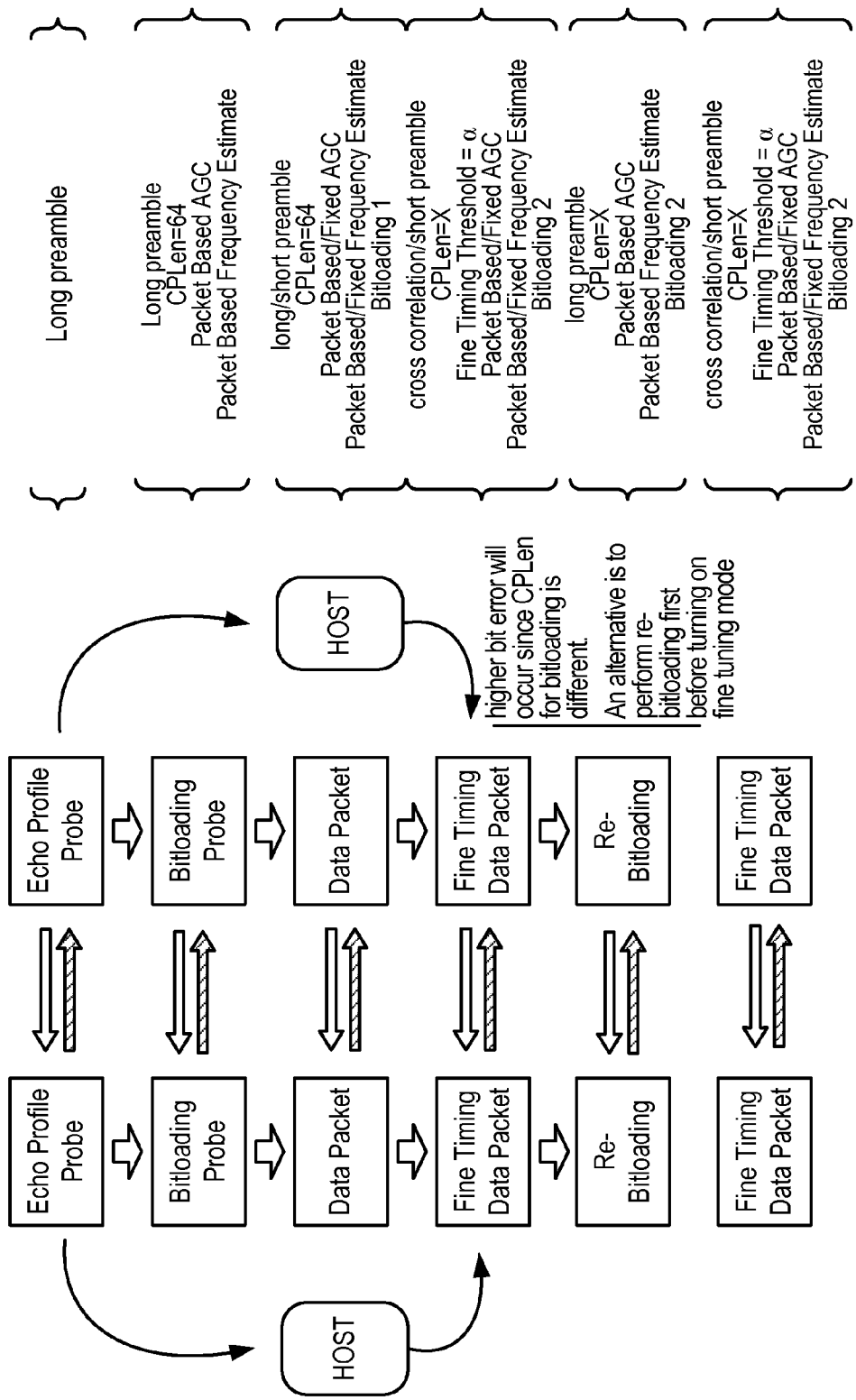
FIG. 3 shows a sequence of communication between two nodes utilizing the preamble according to the present invention.

FIG. 3 shows a series of message communications between two nodes in a network. Each node independently performs the same operations while sending and receiving packets with the other node.

What is claimed is:

1. A method of transmitting message packets from a sending node to a receiving node comprising the steps of:
    a) in a sending node,
        i) forming an initial message packet comprising the concatenation of a message packet preamble comprising a plurality of segments and a data field comprising a plurality of data symbols; and
        ii) transmitting the initial message packet;
    b) in a receiving node:
        i) detecting the initial message packet and from the detected initial message packet, determining at least one unknown signal characteristic of the initial message packet; and
        ii) transmitting to the sending node an implicit response that an unknown characteristic has been determined;
    c) in the sending node, receiving the implicit response that the unknown characteristic has been determined; and
    d) in the sending node:
        i) in response to receiving the implicit response, forming an optimized message packet by removing at least one segment from the preamble of the initial message packet; and
        ii) transmitting the optimized message packet.

2. The method of claim 1, wherein the receiving node processes a long initial message packet sent by the sending node using an auto-correlation function and processes a shorter initial message using a cross-correlation function.

3. A method of transmitting message packets from a sending node to a receiving node comprising the steps of:
    a) in a sending node, forming an initial message packet comprising the concatenation of:
        i) a time domain preamble comprising a short training sequence used for coarse setting of automatic gain control, a long training sequence, and a correlator sequence transmitted as a series of quadrature phase shift keyed (QPSK) symbols;

ii) a frequency domain preamble comprising a plurality of orthogonal frequency division multiplex (OFDM) symbols transmitted with a cyclic prefix; and
iii) a data section comprising a plurality of data symbols transmitted as OFDM symbols;
iv) transmitting the initial message packet;
b) in a receiving node, detecting the initial message packet and determining at least one unknown signal characteristic of the initial message packet;
i) transmitting to the sending node an implicit response that an unknown characteristic has been determined;
c) in the sending node, in response to receiving the implicit response, forming an optimized message packet by removing at least one segment from the preamble of the initial message packet; and
d) transmitting the optimized message packet.

4. The method of claim 3, wherein the long training sequence is used for signal detection, fine frequency offset estimation, and timing synchronization.

5. A method for transmitting message packets from a sending node comprising the steps of:
a) in the sending node, forming an initial message packet comprising the concatenation of a message packet preamble comprising a plurality of segments and a data field comprising a plurality of data symbols;
b) transmitting the initial message packet using signals;
c) in response to the transmission of the initial message packet, receiving an implicit response that a signal characteristic associated with the signals used to transmit the message packet has been determined;
d) in the sending node, in response to receiving the implicit response, forming an optimized message packet by removing at least one segment from the preamble of the initial message packet; and
e) transmitting the optimized message packet.

* * * * *